Jan. 13, 1942.                F. RENNER                    2,269,956
                FILTERING UNIT FOR VACUUM COFFEE UTENSILS
                           Filed Oct. 5, 1938
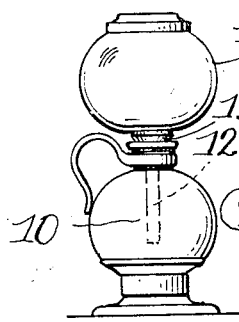
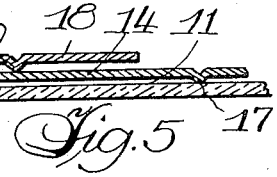
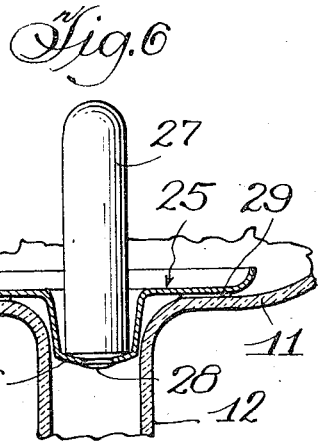
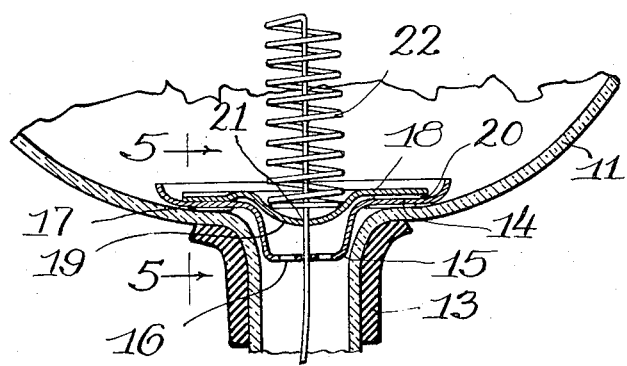
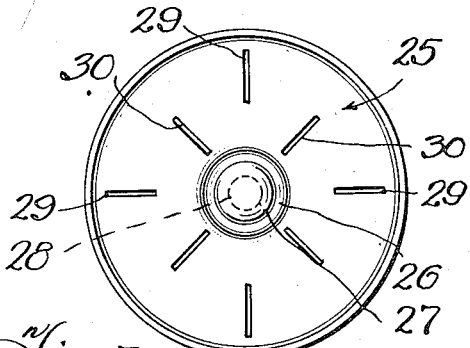
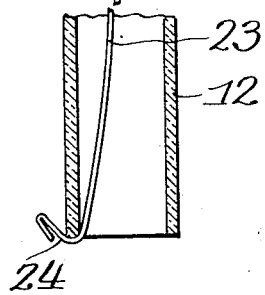
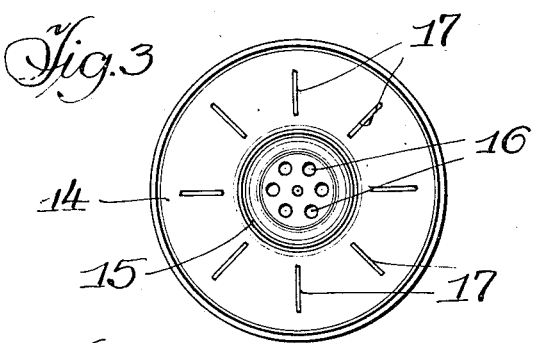
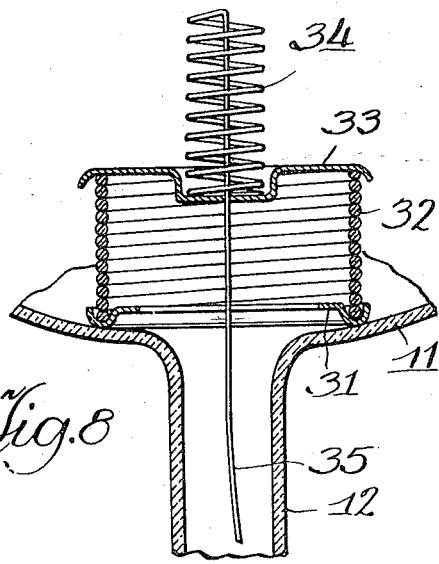
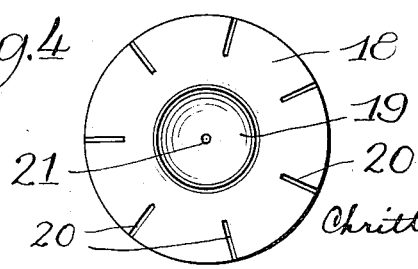
INVENTOR.
Frank Renner,
BY Chritton, Wiles, Davies, Hirschl & Dawson
ATTORNEYS Patented Jan. 13, 1942

2,269,956

UNITED STATES PATENT OFFICE 2,269,956

FILTERING UNIT FOR VACUUM COFFEE UTENSILS

Frank Renner, Chicago, Ill.

Application October 5, 1938, Serial No. 233,470

2 Claims. (Cl. 210—162)

This invention relates to improvements in filtering units for vacuum coffee utensils. Such utensils usually comprise two vessels one of which is a flask and the other a funnel, the latter including a tubular stem extending downwardly into the flask and having a sealed connection therewith by means of an apertured stopper or rubber ring.

The objects of the invention are to provide an improved filter or strainer which is simple, effective, easy to clean and in other respects is readily adapted to meet the requirements of a coffee brewer of the vacuum type.

In the accompanying drawing:

Fig. 1 is a side elevation of a vacuum coffee brewer embodying the invention;

Fig. 2 is an enlarged, partial sectional elevation of the filtering unit;

Fig. 3 is a top view of one of the metal discs of which the filter or strainer is composed;

Fig. 4 is a top view of the other metal disc;

Fig. 5 is an enlarged partial section on the line 5—5 of Fig. 2;

Fig. 6 is a partial sectional view of a modified form of filtering unit or strainer;

Fig. 7 is a top plan view of a disc used therein; and

Fig. 8 is a partial sectional view of another modification.

The vacuum brewer comprises the usual lower flask 10 of any suitable form, and the upper funnel 11 having a depending tubular stem 12. Around the upper end of the stem is a compressible ring 13 which insures an air-tight connection between the upper and lower containers.

The first form of filtering unit or strainer shown in the drawing comprises essentially two discs, one resting on the other. The lower disc 14 has a depressed central portion or boss 15 with perforations 16 therein, one of which is centrally located. Said disc also has ribs 17 struck downwardly therefrom which are preferably only a few thousandths of an inch in height and which rest upon the lower part of the upper of the two glass bowls, as shown in Fig. 2. Said ribs are arranged preferably radially and thus provide a number of radial clearance spaces between the disc and the bowl. These spaces are insufficient in size to permit grounds of coffee to pass therethrough. The outer margin of the disc is preferably turned upwardly, as shown also in Fig. 2. In other words, the member 14 as a whole is somewhat saucer shaped.

The upper disc 18 also has a centrally depressed portion 19 and has ribs 20 struck downwardly therefrom. These ribs also are arranged preferably radially and provide small clearance spaces between the upper disc and the lower disc, insufficient in size to permit the passage of coffee grounds. There are preferably a different number of ribs 20 as compared with the number of ribs 17 so that said ribs will be more or less staggered in arrangement so that the upper ribs will not drop into the recesses or grooves in the lower disc. The upper disc has a central aperture 21 therein aligned with the central aperture in the lower disc.

As shown in Fig. 2, the upper disc is pressed against the lower disc and the latter disc is pressed against the glass, by a helical spring 22 of somewhat conventional form, the wire at the upper end of the coil being bent downwardly and extending down through the two aligned openings and through the tapering glass tube or stem 12. This depending wire 23 has a hook 24 at its lower end to engage the lower end of said stem and maintain the helical spring under compression.

When the water in the lower flask boils, the slight pressure developed causes the water to flow upwardly in the stem 12 and through the small clearance spaces between the two discs and between the lower disc and the glass vessel, and at a later time when the source of heat is removed, a partial vacuum is formed in the lower flask in the usual manner and the coffee is drawn inwardly through the same clearance spaces and downwardly but without drawing down the coffee grounds. By providing ribs for each of the two discs, the clearance spaces are substantially doubled by having them arranged on an upper and a lower level. Thus where the coffee is drawn downwardly very slowly, due to the small vertical height of said clearance spaces and the coffee grounds, the rate of flow may be substantially doubled without increasing the risk of drawing in the coffee grounds, as would be the case if the vertical height of the clearance spaces were increased in order to lessen the delay inherent in filtering or straining the coffee in this manner.

However, since I do not limit myself to ribs of any particular height and since the effectiveness of the filtering or straining operation is dependent among other factors on the extent to which the coffee is ground, i. e. whether it is ground very fine or more coarsely, the ribs 17 on the lower disc may be omitted entirely so that said disc will rest on the bottom of the glass receptacle and, to a great extent, seal the same against leakage of coffee downwardly at that zone. Under such circumstances the filtering or straining operation is carried out by virtue of the clearance spaces between the upper and lower discs. The perforations 16 in the depressed central portion of the lower disc permit the upward and downward flow of liquid therethrough, without material obstruction.

As will be apparent, the strainer or filtering device, when unhooked and removed from the funnel or upper flask, may be readily cleaned and has no filter cloth requiring renewal or presenting the possibility of becoming clogged or causing an unsafe pressure to become established in the lower flask when steam is being generated. The yielding pressure applied by the spring 22 to the upper disc 18 is such that in the case of an emergency, said disc would yield somewhat in an upward direction, thereby permitting a freer flow of the water and steam from the lower to the upper receptacle.

Since the device is made preferably of metal or other non-frangible material, it need not be handled with great care.

A second form of filter or strainer is shown in Figs. 6 and 7 in which a disc 25 is provided, made preferably of metal and somewhat similar in shape to one of the discs previously described, having a depressed central portion 26 which receives a weighted member or handle 27 secured, preferably at the lower end, to the wall 26, as for example by having an extension passing therethrough and headed over or riveted at 28, where said handle is made of metal. Said disc also has a series of ribs or grooves 29 pressed therefrom providing small clearance spaces, as previously described, these ribs being arranged preferably radially near the outer circumference of the disc. An inner group of ribs 30 are also provided, as shown in Fig. 7. One or the other or both sets of these ribs rest on the glass of the upper container near the outlet, depending on the shape of said container, and thus provide the necessary small clearance spaces to permit the upward flow of water, steam and vapor and the downward flow of coffee. This arrangement of two sets of ribs thus insures a better fit on the inner walls of glass flasks of different curvatures, with less danger of having the clearance spaces obstructed by coffee grounds. The handle 27 is of such weight as to hold the disc in place without the necessity of a spring. An unduly high pressure in the lower flask will raise the weighted disc, thus permitting the latter to act as a safety valve.

In Fig. 8 there is shown a lower ring or annular member 31 which serves as a seat for a helical spring 32, having an upper plate 33 with a central depression to receive an open coil spring 34, which latter is normally maintained under compression by a depending wire 35 in a manner similar to that shown in Fig. 2. The adjacent turns of the spring 32 are substantially in contact but not to such an extent as to maintain a perfect seal. On the contrary, the water and steam or vapor escape between the successive turns and in case of too much pressure the upper disc 33 yields somewhat, relaxing the pressure on the adjacent turns. Also, the coffee flows inwardly and downwardly between the adjacent turns of the spring, which thus restrains or filters out the solid material.

Also, the opening in the bottom plate or ring 31 facilitates cleaning of the latter. The converging walls of the small opening or crack between the turns in the helical wire 32 cause an action which is believed to be somewhat similar to a capillary action.

This form of filter also is readily cleaned, as when the lower end of the wire 35 is unhooked, the coil spring 32 tends to open up somewhat whereby it is readily rinsed. Also, the device as a whole is not damaged by dropping it.

Although coffee is used as an illustration of the liquid from which the solids are to be strained, the apparatus described herein is not necessarily limited to use with this beverage.

I claim:

1. In a device of the class described, a disc having a depending central boss with perforations therein, a second disc having a central boss to center the same over said first boss and provide a seat for a coil spring and having an opening aligned with one of said perforations, a coil spring vertically positioned in said seat and having an extension passing downwardly through said aligned openings and ribs on one of said discs to provide a clearance of a few thousandths of an inch between said discs.

2. A filter for a vacuum coffee utensil having a glass flask and a glass funnel with an air-tight connection between the two, said filter comprising two metal members one of which rests in said glass funnel near the outlet thereof and has a central opening therein and an upturned peripheral lip, the other of which is adjacent but slightly above the first member and within the confines of said upturned lip by which it is centered in part, one of said members having projections thereon facing the other of said members and providing clearances permitting liquid to pass therethrough while retaining coffee grounds, and a spring normally pressing said members toward each other, but releasable to permit ready cleaning thereof.

FRANK RENNER.